(12) United States Patent
Komoriya (10) Patent No.: US 12,074,718 B2
(45) Date of Patent: *Aug. 27, 2024

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Mitsuo Komoriya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,793

(22) Filed: Nov. 19, 2021

(65) Prior Publication Data

US 2022/0085919 A1    Mar. 17, 2022

Related U.S. Application Data

(63) Continuation of application No. 16/822,364, filed on Mar. 18, 2020, now Pat. No. 11,218,259.

(30) Foreign Application Priority Data

Apr. 25, 2019   (JP) ................. 2019-084433

(51) Int. Cl.
*H04L 1/1867* (2023.01)
*H04W 28/02* (2009.01)
(Continued)

(52) U.S. Cl.
CPC .............. *H04L 1/188* (2013.01); *H04L 1/189* (2013.01); *H04W 28/0231* (2013.01);
(Continued)

(58) Field of Classification Search
CPC ......... H04W 52/0216; H04W 52/0225; H04W 52/0229; H04W 52/0235; H04W 76/27; Y02D 30/70
See application file for complete search history.

(56) References Cited

U.S. PATENT DOCUMENTS

2018/0020404 A1 *   1/2018  Huang .............. H04W 52/0229
2018/0234921 A1     8/2018  Huang et al.
(Continued)

FOREIGN PATENT DOCUMENTS

JP    2004-015746 A    1/2004
JP    2012074765 A     4/2012
(Continued)

OTHER PUBLICATIONS

Notice of Reasons for Refusal issued by the Japan Patent Office on Dec. 12, 2022 in corresponding JP Patent Application No. 2019-084433, with English translation.
(Continued)

*Primary Examiner* — Pao Sinkantarakorn
(74) *Attorney, Agent, or Firm* — Carter, DeLuca & Farrell LLP (57) ABSTRACT

A communication apparatus operable to communicate with a terminal station capable of operating in a Doze state and Awake state in an IEEE 802.11 ba, decides, based on a congestion degree in a channel for communicating with the terminal station in the Awake state, a waiting time for waiting for a response to a Wake-up frame for causing the terminal station to transit from the Doze state to the Awake state from when the Wake-up frame is transmitted, transmits the Wake-up frame while the terminal station is in the Doze state, and retransmits the Wake-up frame when the waiting time has elapsed after the Wake-up frame is transmitted without receiving the response from the terminal station.

5 Claims, 5 Drawing Sheets

(51) Int. Cl.
  *H04W 28/06* (2009.01)
  *H04W 52/02* (2009.01)
  *H04W 84/12* (2009.01)
  *H04W 88/08* (2009.01)

(52) U.S. Cl.
  CPC ....... *H04W 28/06* (2013.01); *H04W 52/0222* (2013.01); *H04W 52/0229* (2013.01); *H04W 84/12* (2013.01); *H04W 88/08* (2013.01)

(56) References Cited

U.S. PATENT DOCUMENTS

| | | | |
|---|---|---|---|
| 2018/0255514 A1 | 9/2018 | Sun et al. | |
| 2018/0310198 A1 | 10/2018 | Zhou et al. | |
| 2019/0082382 A1* | 3/2019 | Homchaudhuri | H04W 52/0225 |
| 2020/0037250 A1 | 1/2020 | Kim et al. | |
| 2020/0120493 A1* | 4/2020 | Klausner | H04W 12/71 |
| 2020/0196243 A1* | 6/2020 | Kim | H04W 56/00 |
| 2020/0275373 A1* | 8/2020 | Hwang | H04W 28/04 |
| 2021/0153121 A1* | 5/2021 | Huang | H04W 52/0216 |

FOREIGN PATENT DOCUMENTS

| | | |
|---|---|---|
| JP | 2012-227864 A | 11/2012 |
| JP | 2015-130545 A | 7/2015 |
| WO | 2015/121902 A1 | 8/2015 |

OTHER PUBLICATIONS

Huang, Po-Kai, "Comment Resolution for Miscellaneous Topic Part II" IEEE 802.11-19/0029r1, Internet<URL:https://mentor.ieee.org/802.11/dcn/19/11-19-0029-01-00ba-comment-resolution-for-miscellaneous-topic-part-ii.docx> (Jan. 2019) pp. 1-14.

Notice of Reasons for Refusal issued by the Japan Patent Office on Mar. 10, 2023 in corresponding JP Patent Application No. 2019-084433, with English translation.

* cited by examiner

| CASE | CONVENTIONAL RF CHANNEL CONGESTION STATUS | Time Interval |
|---|---|---|
| 1 | NORMAL | $I_0$+50ms |
| 2 | CONGESTED | $I_0$+1000ms |

COMMUNICATION APPARATUS, METHOD OF CONTROLLING COMMUNICATION APPARATUS, AND NON-TRANSITORY COMPUTER-READABLE STORAGE MEDIUM

CROSS REFERENCE TO RELATED APPLICATIONS

This application is a continuation of U.S. patent application Ser. No. 16/822,364, filed on Mar. 18, 2020, which claims the benefit of and priority to Japanese Patent Application No. 2019-084433, filed on Apr. 25, 2019, each of which is hereby incorporated by reference herein in their entirety.

BACKGROUND OF THE INVENTION

Field of the Invention

The present invention relates to a communication apparatus, a method of controlling communication apparatus, and a non-transitory computer-readable storage medium.

Description of the Related Art

Currently, in IEEE 802.11ba, which is being standardized, it has been proposed that a communication apparatus comprises a conventional wireless LAN transmission/reception unit (hereinafter, a conventional RF (Radio Frequency) unit) and a WUR (Wake Up Radio) unit which operates to transmit and receive with lower power consumption (specification of US-2018-0255514). An STA (station) which is a wireless LAN terminal station receives a WUR Beacon periodically transmitted from an AP (access point) while the STA is in a Doze state in which communication is performed by the WUR unit. By receiving the WUR Beacon, the STA can maintain synchronization with the AP without performing communication by a conventional RF unit.

When data to be transmitted from the AP to the STA is generated during the Doze state of the STA, the AP transmits a WUR Wake-up frame (hereinafter, referred to as a Wake-up frame) to the STA. The STA, after receiving the Wake-up frame, ends the Doze state and transits to an Awake state in which communication is performed by the conventional RF unit. Then, the conventional RF unit of the STA transmits a response signal to the AP with respect to the Wake-up frame, thereby notifying that the STA has transited to the Awake state. The AP, after receiving the notification, recognizes that the STA has transited to the Awake state and transmits data to the STA, and the conventional RF unit of the STA can receive the data.

As described above, after the AP transmits a Wake-up frame in order to cause the STA to transit from the Doze state to the Awake state, the AP waits for the response signal with respect to the frame in order to recognize that the STA has transited to the Awake state. Here, after transmitting the Wake-up frame, the AP waits for reception of a response signal from the STA for a predetermined waiting time (Time Interval). The AP may retransmit the Wake-up frame if the AP is unable to receive a response signal from the STA within the predetermined waiting time. A reason why the AP cannot receive the response signal from the STA within the predetermined waiting time may be, for example, that the STA failed to receive the Wake-up frame. In contrast, even if the STA successfully receives the Wake-up frame, if a channel used to transmit the response signal is congested, it is possible that the AP will not be able to receive the response signal from the STA within the predetermined waiting time. In this instance, although the STA has successfully received the Wake-up frame, the AP must retransmit the Wake-up frame, and the STA and the AP consume unnecessary power and channel resources.

SUMMARY OF THE INVENTION

In view of the above problems, the present disclosure provides a technique for preventing retransmission of unnecessary Wake-up frames by an AP.

According to one aspect of the present invention, there is provided a communication apparatus operable to communicate with a terminal station capable of operating in a Doze state in which transmission or reception of a frame other than a WUR (Wake-up Radio) frame in an IEEE 802.11 ba standard is not possible, and in an Awake state in which power consumption is higher than in the Doze state in the standard, which comprises: a decision unit configured to, based on a congestion degree in a channel for communicating with the terminal station in the Awake state, decide a waiting time, which is a time period for waiting for a response to a Wake-up frame for causing the terminal station to transit from the Doze state to the Awake state from when the Wake-up frame is transmitted; a transmission unit configured to transmit the Wake-up frame while the terminal station is in the Doze state; and a retransmission unit configured to retransmit the Wake-up frame when the waiting time has elapsed after the Wake-up frame is transmitted without receiving the response from the terminal station.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(Network Configuration)

Figure 1:
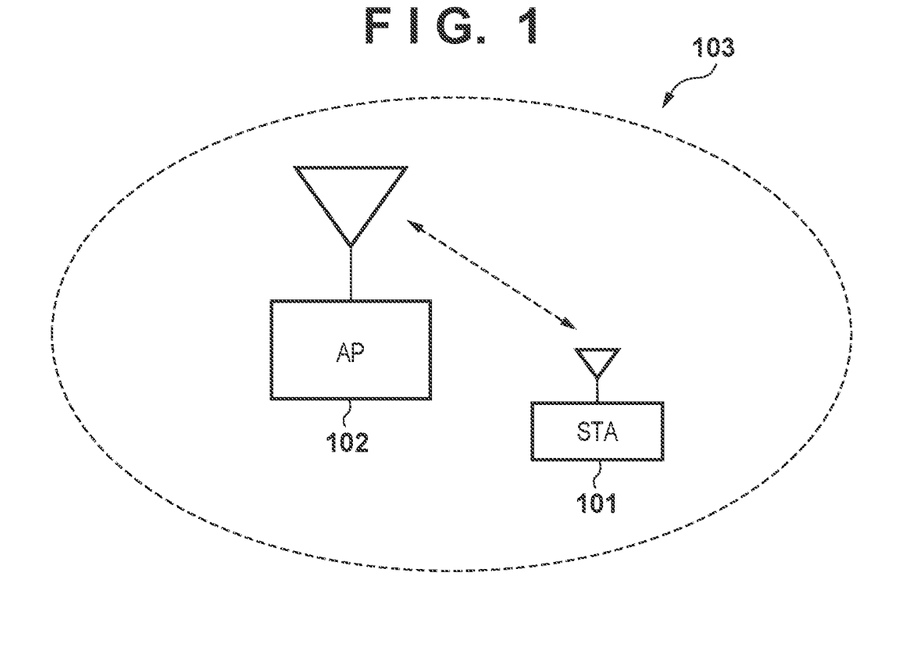
FIG. 1 shows an example of a network configuration.

FIG. 1 shows a configuration example of a network according to the present embodiment. FIG. 1 shows a network configuration that includes one station/terminal station (STA 101) and one access point (AP 102). The STA 101 and the AP 102 are wireless communication apparatuses that support WUR conforming to the IEEE 802.11ba standard, and have a conventional RF (Radio Frequency) unit and a WUR unit (corresponding to the conventional RF unit 211 and the WUR unit 212 shown in FIG. 2), respectively. As shown in FIG. 1, it is assumed that a range in which a signal transmitted by the conventional RF unit and the WUR unit of the AP 102 can be received is indicated by a communication range 103, and a signal transmitted by the AP 102 can be received by the STA 101. It is desirable that the difference in the range in which a signal transmitted by the conventional RF unit and the WUR unit can be received is small, but there is no limitation to this. This network configuration is an example, and the following discussion can be applied to, for example, a network including a large number of STAs and APs in a wide area, and to the positional relationship of various communication apparatuses.

(Configuration of AP)

Figure 2:
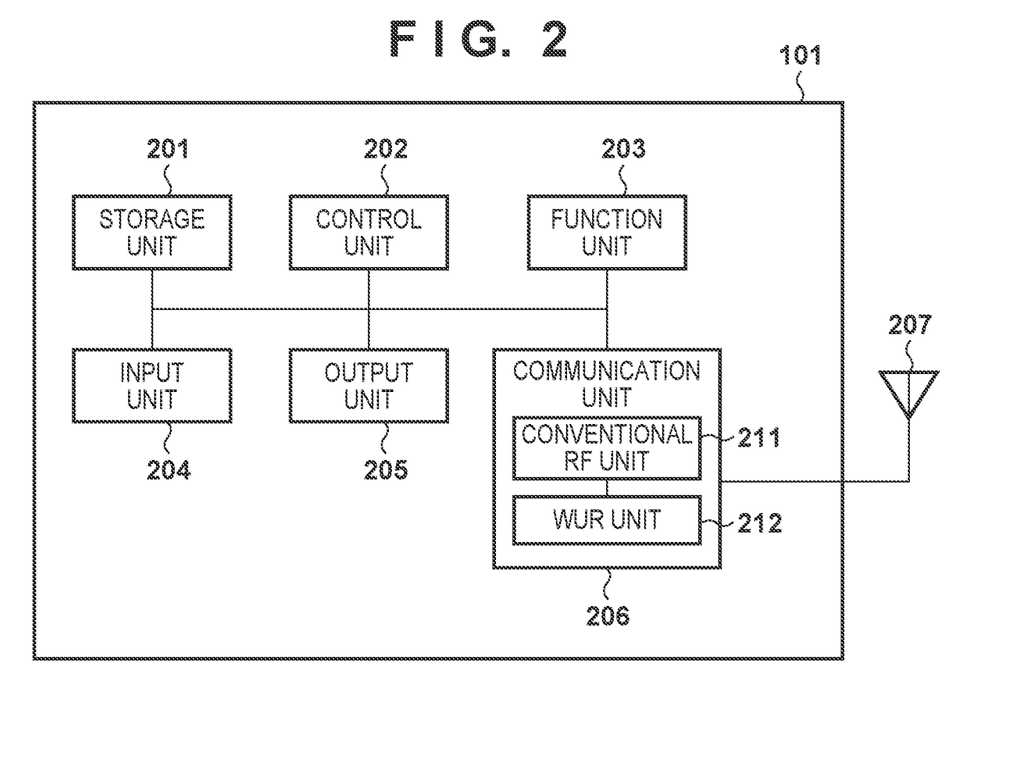
FIG. 2 shows an example of a hardware configuration of an AP.

FIG. 2 shows a hardware configuration of the AP 102. As an example of the hardware configuration, the AP 102 includes a storage unit 201, a control unit 202, a function unit 203, an input unit 204, an output unit 205, a communication unit 206, and an antenna 207.

The storage unit 201 is configured by one or more memories such as a ROM and a RAM, and stores various information such as programs for performing various operations to be described later, communication parameters for wireless communication, and the like. The storage unit 201 stores information for managing the STA which is operating in the Doze state and connects to the AP 102. As the storage unit 201, a storage medium such as a flexible disk, a hard disk, an optical disk, a magneto-optical disk, a CD-ROM, CD-R, a magnetic tape, a nonvolatile memory card, a DVD, or the like may be used in addition to a memory such as a ROM or a RAM.

The control unit 202 is configured by one or more processors such as CPUs and MPUs, and controls the entire AP 102 by executing a program stored in the storage unit 201. The control unit 202 may control the entire AP 102 in cooperation with a program stored in the storage unit 201 and an OS (Operating System). In addition, the control unit 202 may include a plurality of processors such as multi-cores, and the entire AP 102 may be controlled by the plurality of processors. The control unit 202 controls the function unit 203 to execute predetermined processing such as imaging, printing, and projection. The function unit 203 is hardware for the AP 102 to execute a predetermined process. For example, when the AP 102 is a camera, the function unit 203 is an imaging unit and performs an imaging process. For example, when the AP 102 is a printer, the function unit 203 is a printing unit and performs a printing process. For example, when the AP 102 is a projector, the function unit 203 is a projection unit and performs a projection process. The data processed by the function unit 203 may be data stored in the storage unit 201, or data communicated from another communication apparatus via a communication unit 206 described later.

The input unit 204 accepts various operations from the user. The output unit 205 performs various outputs with respect to a user. Here, the output by the output unit 205 includes at least one of display on a screen, sound output by a speaker, vibration output, and the like. It should be noted that both the input unit 204 and the output unit 205 may be realized by one module as in a touch panel.

The communication unit 206 controls the conventional RF unit 211, the WUR unit 212, and the antenna 207 to transmit and receive wireless signals for wireless communication. The conventional RF unit 211 controls wireless communication compliant with Wi-Fi or a standard of the IEEE 802.11 series (including the IEEE 802.11ba standard) and controls IP (Internet Protocol) communication. The conventional RF unit 211 may communicate contents such as image data, document data, and video data with the STA 101 by using conventional RF channels. The WUR unit 212 controls wireless communication compliant with IEEE 802.11ba (WUR function). Generally, since the AP 102 performs only transmission processing in the WUR unit 212, the communication unit 206 can cause only the transmission function of the WUR unit 212 to operate. The WUR unit 212 transmits a WUR frame to an STA that is in the Doze state via a WUR channel. The WUR frame includes a WUR Beacon frame, a Wake-up frame, a WUR Discovery frame, or the like. A Wake-up frame is a frame for causing the STA to transit from the Doze state to the Awake state. The WUR Beacon frame and the WUR Discovery frame will be described later. For the antenna 207, although only one is shown in FIG. 2, configuration may be taken to have two or more in order to perform MIMO (Multiple-Input Multiple-Output) communication.

The hardware configuration of the STA 101 is similar to that of FIG. 2, and as an example includes a storage unit 201, a control unit 202, a function unit 203, an input unit 204, an output unit 205, a communication unit 206, and an antenna 207. However, since the STA 101 typically performs only reception processing in the WUR unit 212, the communication unit 206 can cause only the reception function of the WUR unit 212 to operate. That is, the WUR unit 212 receives the WUR frame in a time period in which the STA 101 is in the Doze state. Further, the WUR unit 212, when having received a Wake-up frame, causes the Doze state to end, and, via the communication unit 206 (or the control unit 202), causes the conventional RF unit 211 to transit from the Doze state to the Awake state (STA 101 enters the Awake state). The Doze state is a power saving state in which the function of transmitting and receiving signals to and from the AP 102 using the conventional RF unit 211 is stopped. The Awake state is a state in which the conventional RF unit 211 of the STA 101 can transmit and receive signals to and from the conventional RF unit 211 of the AP 102.

Figure 3:
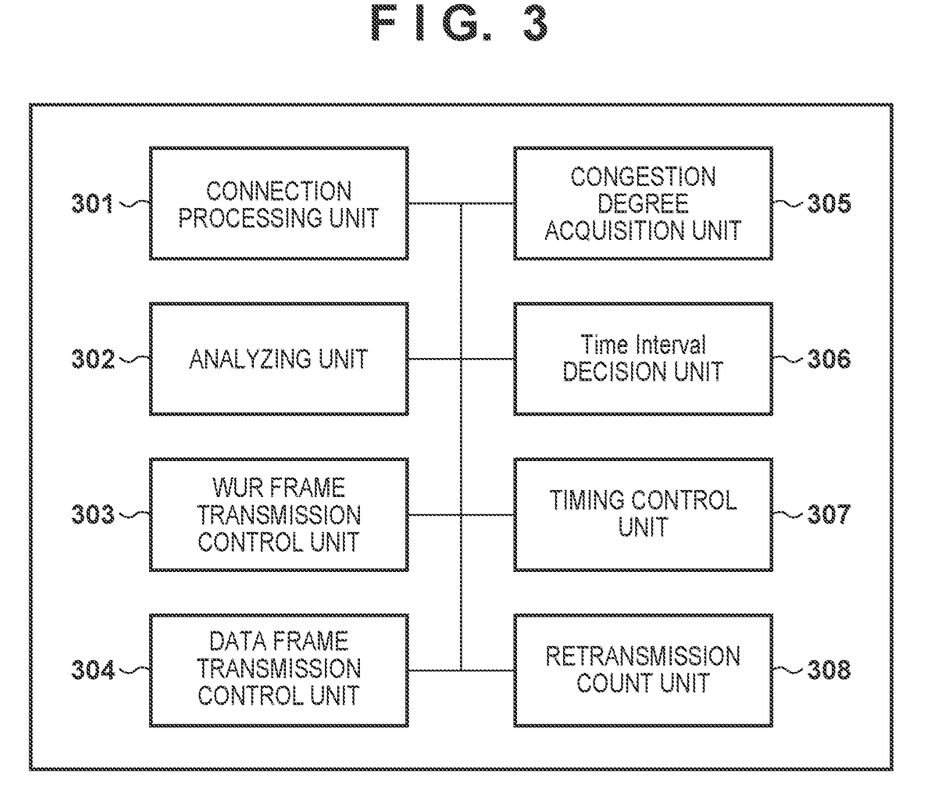
FIG. 3 shows an example of a functional configuration of the AP.

FIG. 3 is a diagram illustrating an example of a functional configuration of the AP 102. The AP 102 includes, as an example of its functional configuration, a connection processing unit 301, an analyzing unit 302, a WUR frame transmission control unit 303, a data frame transmission control unit 304, a congestion degree acquisition unit 305, a Time Interval decision unit 306, a timing control unit 307, and a retransmission count unit 308. The connection processing unit 301 executes connection processing defined by a standard of the IEEE 802.11 series via the conventional RF unit 211 of the communication unit 206. The analyzing unit 302 analyzes a signal received via the communication unit 206. The WUR frame transmission control unit 303 controls transmission of a WUR frame via the WUR unit 212 of the communication unit 206. The data frame transmission control unit 304 controls transmission of the data frame via the conventional RF unit 211 of the communication unit 206. The congestion degree acquisition unit 305 acquires a congestion degree (congestion status) of the conventional RF channel After transmitting a Wake-up frame, the Time Interval decision unit 306 decides a Time Interval which is a waiting time of a response signal for the frame. The timing control unit 307 performs a time measurement process from a predetermined timing and a process of comparing a measured time period with a predetermined time period. The retransmission count unit 308 performs processing for counting the number of retransmissions of the Wake-up frame by the WUR unit 212, and comparing the counted number of retransmissions with a predetermined number.

(Processing Flow)

Figure 4:
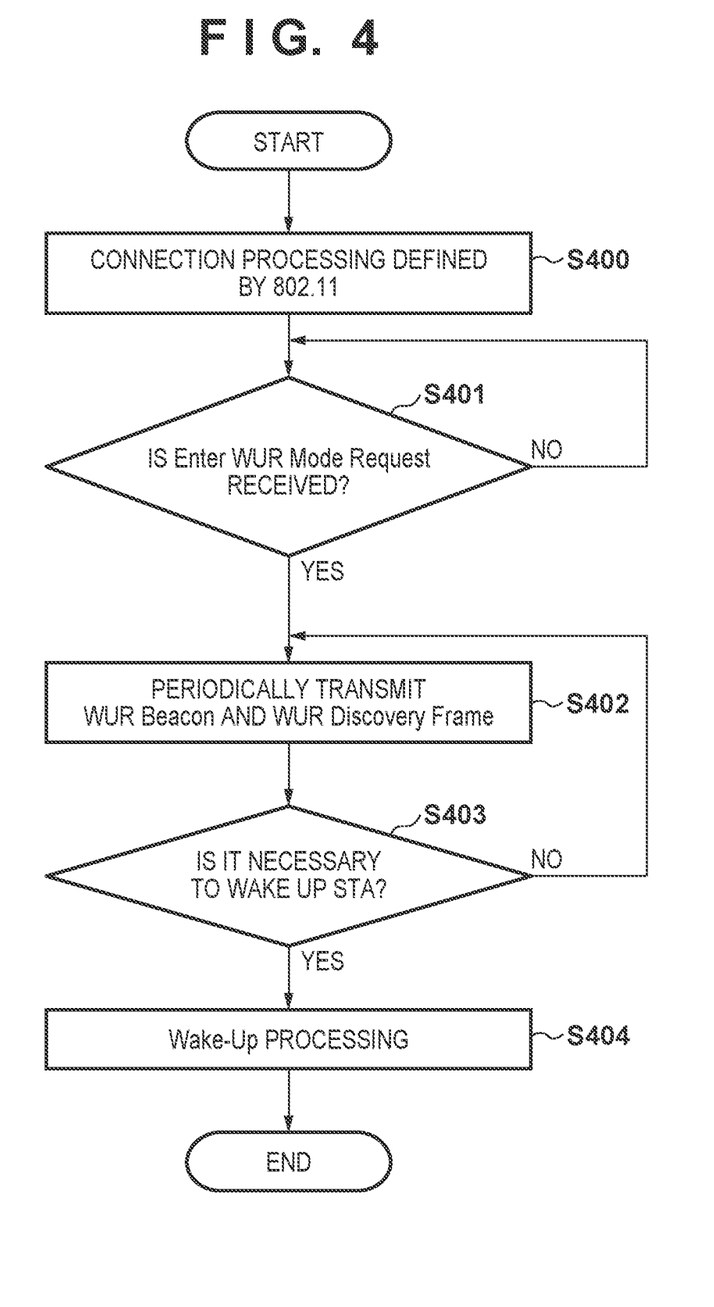
FIG. 4 is a flow chart showing an example of a flow of processing executed by the AP for establishing a connection with an STA in the Doze state, and performing Wake-up.
Figure 5:
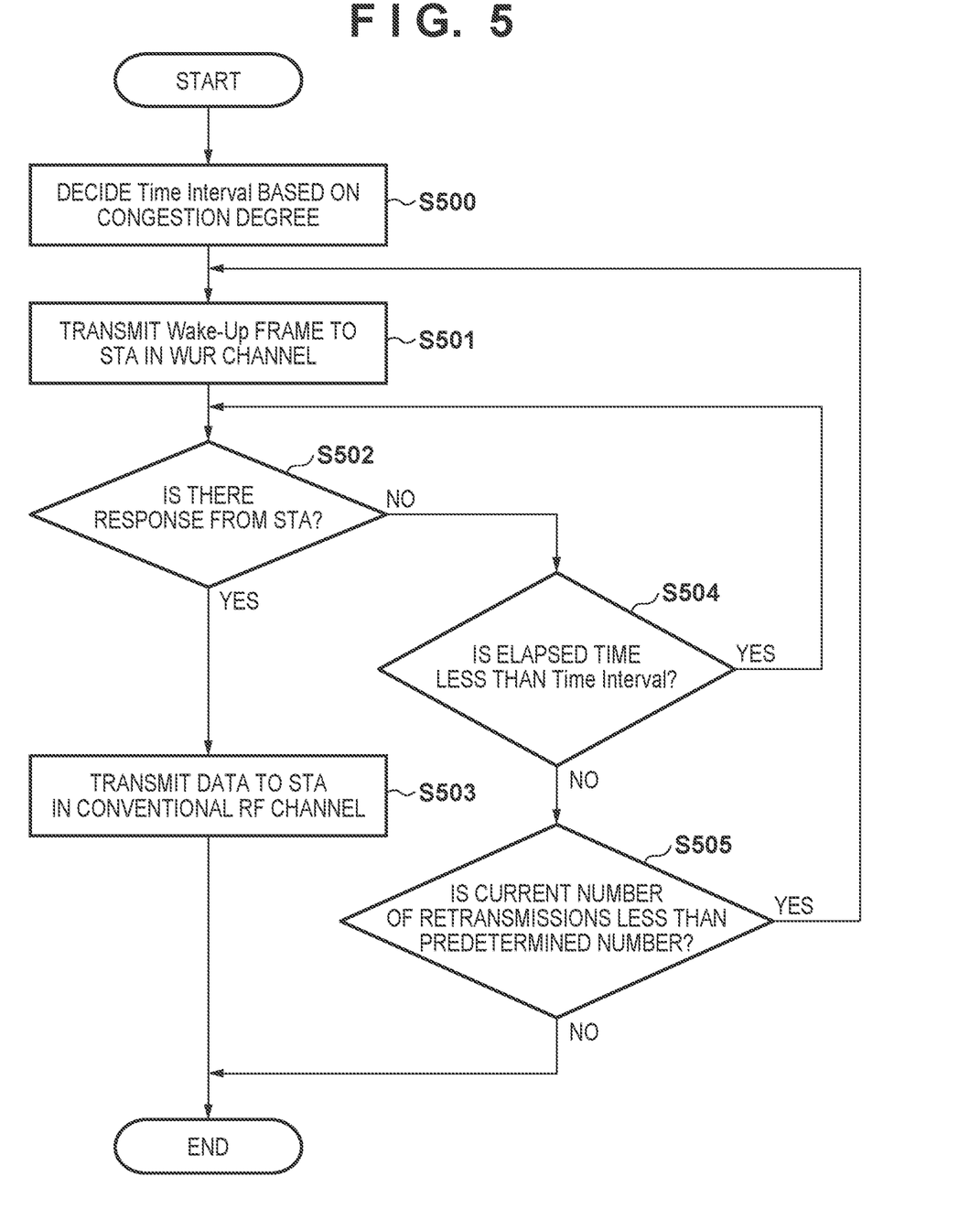
FIG. 5 is a flow chart showing Wake-up processing executed by the AP.

Next, the flow of processing executed by the AP in the present embodiment will be described with reference to FIGS. 4 and 5. The processing shown in FIGS. 4 and 5 can be realized by the control unit 202 executing a program stored in the storage unit 201. Note that there may be a configuration while some or all of the processing shown in FIGS. 4 and 5 is implemented by hardware such as an ASIC. Here, ASIC is an abbreviation of Application Specific Integrated Circuit.

FIG. 4 is a flow chart showing an example of a flow of processing until the AP 102 establishes the connected state with the STA 101 in the Doze state and executes Wake-up processing (processing for entering the Awake state specified by a standard of the IEEE 802.11 series). The flow chart may be started after activation of the AP 102 and prior to connection to the STA 101. Further, it is assumed that this flow chart is started in a state where the WUR unit 212 of the AP 102 can communicate (a state in which WUR unit 212 is enabled). The IEEE 802.11ba standard defines a negotiation process for up until the start of WUR operation.

First, in step S400, the connection processing unit 301 of the AP 102 executes connection processing specified by a standard of the IEEE 802.11 series, and communicates WUR-specific information between the AP 102 and the STA 101. Specifically, firstly, the connection processing unit 301 transmits a conventional Beacon frame or a Probe Response frame that include a WUR Capabilities Element indicating that the AP 102 is an AP that supports WUR. As a result, the STA 101, which is the communication partner apparatus, is notified that the AP 102 supports WUR. The STA 101 transmits a Probe Request frame to the AP 102 and is notified of the presence and the AP 102 and whether the AP 102 supports WUR by receiving a Probe Response frame or receiving a Beacon frame that is transmitted by the AP 102. The STA 101 then sends a Authentication Request frame and an Association Request frame to the AP 102 to connect to the AP 102. The AP 102 establishes a connection by sending an Authentication Response frame and an Association Response frames as respective responses.

Here, the STA 101 includes, in the Authentication Request frame and the Association Request frame, information on an amount of time (Transition Delay) required for the conventional RF unit 211 of the STA 101 to transit from the Doze state to the Awake state. In other words, Transition Delay is the amount of time required for the conventional RF unit 211 to be able to transit from the Doze state to the Awake state and restart the transmission and reception of signals. Transition Delay may be included in WUR Capabilities in a WUR Capabilities Element in the Authentication Request frame and the Association Request frame.

Although a connection without encryption is described in this embodiment, a connection with encryption defined by WEP, WPA1, WPA2, WPA3, or the like may be used. WEP is an abbreviation of Wired Equivalent Privacy and WPA is an abbreviation of Wi-Fi Protected Access. In addition, the AP 102 can share parameters required for WUR operation with the STA 101 by including a WUR Operation Element in a particular management frame. The parameters include a WUR Channel indicating WUR transmission channel information, a WUR Beacon Period indicating transmission intervals of WUR Beacon frames, and the like. A particular management frame may refer to a Beacon frame, a Probe Response frame, an Association Response frame, or the like.

After a connection is established between the AP 102 and the STA 101, the STA 101 transmits an Action frame to the AP 102, to thereby request that the STA 101 start operation in the Doze state. The Action frame is defined by IEEE 802.11ba as Category Code32. When 0 is set to a WUR Action field in the Action frame, it means a WUR Mode Setup frame which is a Doze state operation start request. However, when 1 is set to the WUR Action field, it means a WUR Mode Teardown frame which is a Doze state operation end request. The WUR Mode Setup frame includes a WUR Mode Element which includes an Action Type field and a WUR Mode Response Status Definition field. When the Action Type field indicating the type of Doze state process is 0, it means an Enter WUR Mode Request, and when it is 1, it means an Enter WUR Mode Response. When the WUR Mode Response Status Definition field which indicates acceptance enabled/disabled for a receiving side is 0, it means Accept, and when it is 1 or 2, it means Denied. Accept means that the AP 102 accepts the Doze state processing requested by the STA 101, and Denied means that the processing is rejected. In the present embodiment, a frame having a WUR Mode Setup frame Action Type field of 0 is referred to as an Enter WUR Mode Request frame. A WUR Mode Setup frame where the Action Type field is 1 is referred to as an Enter WUR Mode Response frame.

The WUR Mode Element includes Starting Time Of The WUR Duty Cycle indicating the start time of a WUR Duty Cycle Period. The WUR Mode Element also includes On Duration and Duty Cycle Period. WUR Duty Cycle defines a WUR operation period, and a time period defined by On Duration in a time period for Duty Cycle Period indicates that the WUR STA is in the Awake state. This ensures that the STA 101 (WUR STA) is in a state where it can receive a WUR frame from the AP 102 (WUR AP) during this time period.

Subsequently, in step S401, the analyzing unit 302 of the AP 102 monitors whether or not an Enter WUR Mode Request frame is received from the STA 101 by the conventional RF unit 211. If an Enter WUR Mode Request frame has not been received (NO in step S401), reception is repeatedly monitored. When an Enter WUR Mode Request frame is received (YES in step S401), the AP 102 WUR frame transmission control unit 303 transmits an Enter WUR Mode Response frame with the WUR Mode Response Status Definition field as 0.

Upon receiving the Enter WUR Mode Response frame, the STA 101 starts operation in the Doze state, and causes the conventional RF unit 211 to transit to the Doze state. As a result, it is possible to suppress power consumed in communication with the AP 102 by the conventional RF unit. Subsequently, in step S402, the WUR frame transmission control unit periodically transmits a WUR Beacon frame and a WUR Discovery frame. Configuration may be taken to transmit only one of the WUR Beacon frame and the WUR Discovery frame.

The WUR Beacon frame and the WUR Discovery frame will be described later. A WUR Beacon frame is defined in a WUR frame format, and is transmitted at the period of the WUR Beacon Period on a channel of WUR Channel which is conveyed to the STA 101 in WUR Operation Element. A WUR Beacon frame includes, for example, a Transmit ID for identifying the AP 102 and a TD (Time Dependent) Control for synchronizing with the STA 101. The STA 101 uses these pieces of information and Starting Time Of The WUR Duty Cycle to synchronize the reception timings of WUR Beacon frames. Starting Time Of The WUR Duty Cycle is included in WUR Mode Element of a WUR Mode Setup frame.

A WUR Discovery frame is defined in a WUR frame format, and is transmitted according to information notified in a WUR Discovery Element included in a conventional Beacon frame and a Probe Response frame. A WUR Discovery Frame is a WUR Frame used by a WUR STA to discover a WUR AP. The parameters of WUR Discovery Frame are exchanged in this WUR Discovery Element via conventional RF units. More specifically, in a channel set in WUR Discovery channel, data is transmitted every period that is set as the WUR Discovery Period.

Next, in step S403, the AP 102 determines whether the STA 101 needs to wake up (transition to the Awake state). The determination is performed, for example, when the control unit 202 determines that data desired to be transmitted from the AP 102 to the STA 101 has occurred, or in response to an operation performed by a user via the input unit 204, or the like. If the STA 101 needs to wake up, Wake-up processing is executed to transition the STA 101 which operates in the Doze state to the Awake state (step S404). Wake-up processing will be described later with reference to FIG. 4.

Figure 6:
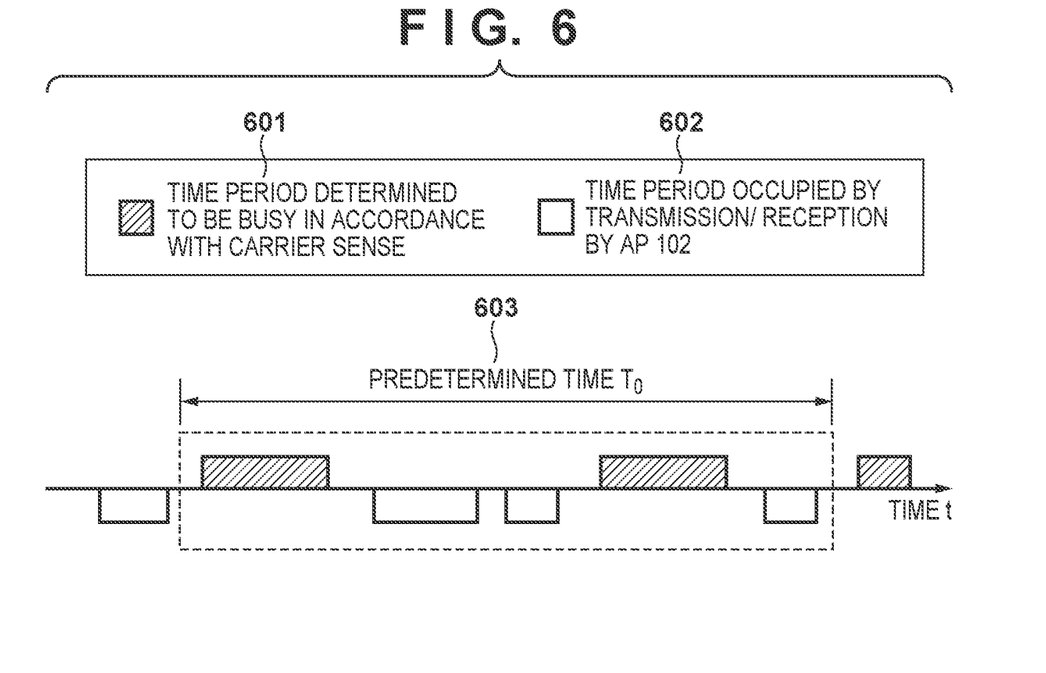
FIG. 6 shows an example of a conventional procedure for obtaining a congestion degree of an RF channel.

During the processing of step S401 to step S404, the congestion degree acquisition unit 305 of the AP 102 periodically (e.g., every one second) acquires the congestion degree (congestion state) of a conventional RF channel in the background. FIG. 6 shows an example of a conventional procedure for obtaining a congestion degree of an RF channel. In FIG. 6, the horizontal axis represents time t. As an example of procedures for acquiring the congestion degree, the congestion degree acquisition unit 305 calculates an evaluation value indicating the congestion degree for a predetermined time period $T_0$ 603. The evaluation value is calculated as in Equation 1 for the predetermined time period $T_0$ 603 from the total $T_{CS}$ of the time period 601 determined to be busy when the AP 102 performs a carrier sense process in the conventional RF channel and the total $T_{TR}$ of the time period 602 occupied by the transmission and reception by the AP 102.

$$(T_{CS}+T_{TR})/T_0 \qquad \text{Equation 1}$$

In Equation 1, both $T_{CS}$ and $T_{TR}$ are used, but either may be used. The congestion degree acquisition unit 305 may acquire the congestion degree not while the STA 101 is in the Doze state (during the processing of step S401 to step S404), but during the Awake state prior to the STA 101 transiting to the Doze state, or in a time between the Awake state and the Doze state.

FIG. 5 is a flow chart showing an example flow of the Wake-up processing 404 of the AP 102 in FIG. 4. First, in step S500, the Time Interval decision unit 306 of the AP 102 decides the Time Interval based on the congestion degree (in the above example, an evaluation value that indicates the congestion degree) of the conventional RF channel acquired by the congestion degree acquisition unit 305. As described above, the Time Interval is a waiting time in which the AP 102 waits for a response (reception of response signal) from the STA after transmitting a Wake-up frame to the STA. When the WUR unit 212 of the STA 101 receives a Wake-up frame, it starts the processing for Wake-up of the conventional RF unit 211. At this time, if the conventional RF channel is congested when the conventional RF unit 211 responds to the AP 102 by the conventional RF channel, there is a high possibility that a waiting time will occur in transmitting the response signal. As a result, the AP 102 cannot receive the response signal within the Time Interval, and the AP 102 retransmits a Wake-up frame despite the Wake-up of the STA 101 having succeeded. To prevent this, Time Interval decision unit 306 sets the Time Interval to be longer when it is determined that the conventional RF channel is congested. The response signal transmitted from the STA 101 addressed to the AP 102 may be configured as a PS-Poll frame defined in the IEEE 802.11 series, for example.

Figure 7:
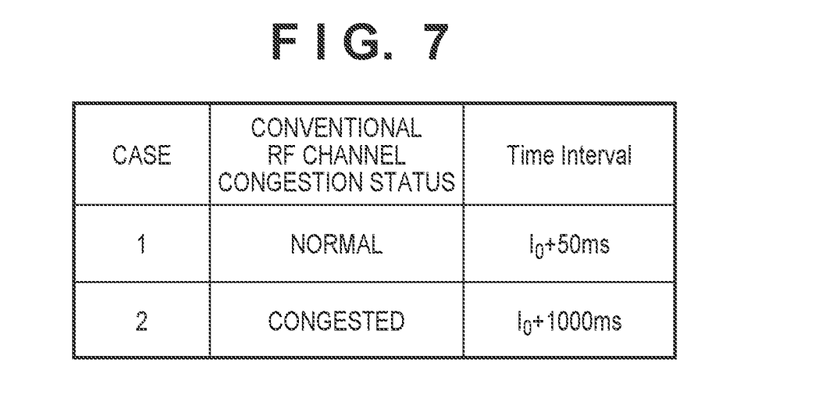
FIG. 7 shows an example of a Time Interval.

FIG. 7 shows an example of a decided Time Interval. In the example of FIG. 7, Time Interval decision unit 306 compares the evaluation value of the congestion degree of the conventional RF channel shown in Equation 1 with a predetermined value (0.9), and depending on whether the evaluation value is greater than or equal to the predetermined value or less than the predetermined value, decides the Time Interval separately. For example, when the evaluation value of the congestion degree of the conventional RF channel shown in Equation 1 is 0.9 or more, the Time Interval decision unit 306 determines that the congestion state of the conventional RF channel is "congestion". Otherwise, the Time Interval decision unit 306 determines that the congestion status of the conventional RF channel is "normal". When "congestion" is determined, Time Interval decision unit 306 decides the Time Interval as the time period obtained by adding 1000 ms to Transition Delay I0. When "normal" is determined, Time Interval decision unit 306 decides the Time Interval as the time period obtained by adding 50 ms to Transition Delay I0.

Next, in step S501, the WUR frame transmission control unit 303 of the AP 102 transmits a Wake-up frame to the STA 101 in the WUR channel. At the timing when Wake-up frame is transmitted, the timing control unit 307 starts measuring a time period until the reception of the response signal. Thereafter, when the response signal is received from the STA 101 (Yes in step S502), the data frame transmission control unit 304 transmits data to the STA 101 in the conventional RF channel (step S503). When the response signal is not received (No in step S502), the timing control unit 307 determines whether the time period elapsed waiting for the response signal (the time period measured by the timing control unit 307) is less than the Time Interval decided in step S500 (step S504). If the time period elapsed waiting for the response signal is less than the Time Interval (Yes in step S504), the processing returns to step S502. When the time period elapsed waiting for the response signal is greater than or equal to Time Interval (time period that has elapsed is after the passage of Time Interval) (No in step S504), the retransmission count unit 308 determines whether the present number of retransmissions is less than a predetermined number (step S505). If the present number of retransmissions is less than the predetermined number (Yes in step S505), the process returns to step S501, and the WUR frame transmission control unit 303 retransmits the Wake-up frame. If the present number of retransmissions is greater than or equal to the predetermined number (No in step S505), the WUR frame transmission control unit 303 does not further retransmit the Wake-up frame. The number of retransmissions may be decided prior to the first transmission of the Wake-up frame.

As described above, according to the present embodiment, it is possible to prevent the AP from retransmitting unnecessary Wake-up frames and consuming unnecessary power and WUR channel resources when the channel used in the Awake state is congested.

[First Variation]

In FIG. 6, a Time Interval corresponding to the congestion state is decided in two steps, but the number of steps may be increased in accordance with the evaluation value of the congestion state. For example, the Time Interval may be decided according to respective congestion conditions by setting "congestion" when the evaluation value is 0.9 or more, "normal" when the evaluation value is 0.1 or more and less than 0.9, and "quiet" when the evaluation value is less than 0.1. Also, the value of the Time Interval is not limited to the values shown in FIG. 7. That is, it is sufficient if the Time Interval decision unit 306 sets the Time Interval to a value greater than or equal to Transition Delay.

[Second Variation]

FIG. 4 described in the above embodiment discloses a flow chart for a case in which one WUR STA transitions to Doze operation. When there are a plurality of STAs that perform communication based on the AP 102 and IEEE 802.11ba standard, the processing shown in FIG. 4 is executed for the respective STAs in the same manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-084433, filed Apr. 25, 2019, which is hereby incorporated by reference herein in its entirety.

What is claimed is:

1. A communication apparatus operable to communicate with a terminal station capable of operating in a Doze state in which transmission or reception of a frame other than a WUR (Wake-up Radio) frame in an IEEE 802.11ba standard is not possible, and in an Awake state in which power consumption is higher than in the Doze state in the standard, the communication apparatus comprising:
one or more processors; and
at least one memory coupled to the one or more processors and having stored thereon instructions, which when executed by the one or more processors, cause the communication apparatus to:
transmit a Wake-up frame in a first channel while the terminal station is in the Doze state at least after receiving an Enter WUR Mode Request; and
in a case where a response to the Wake-up frame is not received from the terminal station, after elapse of a Transition Delay that indicates a time that is required for the terminal station to transition from the Doze state to the Awake state and after elapse of a waiting time corresponding to a congestion condition of the first channel, retransmit the Wake-up frame,
wherein the communication apparatus determines as a congestion state of the first channel, based on the congestion condition of the first channel, one of a plurality of levels of congestion states including at least a first congestion state, a second congestion state, and a third congestion state, and
wherein a waiting time corresponding to the first congestion state, a waiting time corresponding to the second congestion state, and a waiting time corresponding to the third congestion state are different from each other.

2. The communication apparatus according to claim 1, wherein the communication apparatus retransmits the Wake-up frame when a number of retransmissions of the Wake-up frame is less than a predetermined number.

3. The communication apparatus according to claim 1, wherein the communication apparatus transmits a data frame on a channel used for communication with the terminal station operating in the Awake state when the response is received from the terminal station.

4. A method of controlling a communication apparatus that communicates with a terminal station capable of operating in a Doze state in which transmission or reception of a frame other than a WUR (Wake-up Radio) frame in an IEEE 802.11ba standard is not possible, and in an Awake state in which power consumption is higher than in the Doze state in the standard, the method comprising:
transmitting a Wake-up frame in a first channel while the terminal station is in the Doze state at least after receiving an Enter WUR Mode Request; and
in a case where a response to the Wake-up frame is not received from the terminal station, after elapse of a Transition Delay that indicates a time that is required for the terminal station to transition from the Doze state to the Awake state and after elapse of waiting time corresponding to a congestion condition of the first channel, retransmitting the Wake-up frame,
wherein one of a plurality of levels of congestion states including at least a first congestion state, a second congestion state, and a third congestion state is determined, based on the congestion condition of the first channel, as a congestion state of the first channel, and
wherein a waiting time corresponding to the first congestion state, a waiting time corresponding to the second congestion state, and a waiting time corresponding to the third congestion state are different from each other.

5. A non-transitory computer-readable storage medium storing a computer program for causing a computer to execute a method of controlling a communication apparatus, wherein the communication apparatus is configured to communicate with a terminal station capable of operating in a Doze state in which transmission or reception a frame other than a WUR (Wake-up Radio) frame in an IEEE 802.11ba standard is not possible, and in a Awake state in which power consumption is higher than in the Doze state in the standard, the method comprising:

transmitting a Wake-up frame in a first channel while the terminal station is in the Doze state at least after receiving an Enter WUR Mode Request; and in a case where a response to the Wake-up frame is not received from the terminal station, after elapse of a Transition Delay that indicates a time that is required for the terminal station to transition from the Doze state to the Awake state and after elapse of waiting time corresponding to a congestion condition of the first channel, retransmitting the Wake-up frame, wherein one of a plurality of levels of congestion states including at least a first congestion state, a second congestion state, and a third congestion state is determined, based on the congestion condition of the first channel, as a congestion state of the first channel, and wherein a waiting time corresponding to the first congestion state, a waiting time corresponding to the second congestion state, and a waiting time corresponding to the third congestion state are different from each other.

* * * * *